July 11, 1961     M. ALEXANDER     2,991,975

LOAD BINDER

Filed Oct. 5, 1959     2 Sheets-Sheet 1

INVENTOR
MICHAEL ALEXANDER
BY Eric P. Schellin
ATTORNEY

July 11, 1961  M. ALEXANDER  2,991,975
LOAD BINDER

Filed Oct. 5, 1959  2 Sheets-Sheet 2

INVENTOR
MICHAEL ALEXANDER

BY Eric P. Schellin

ATTORNEY

United States Patent Office 2,991,975
Patented July 11, 1961

2,991,975
LOAD BINDER
Michael Alexander, 132 W. 73rd St., New York, N.Y.
Filed Oct. 5, 1959, Ser. No. 844,481
2 Claims. (Cl. 254—164)

This invention relates to a means for retaining cables under tension. More particularly, this invention relates to apparatus for holding taut a cable employed in tying merchandise onto the flat-bed of moving vehicles.

It is well known in commerce to employ flat-bed trucks and flat-bed railroad cars in order to carry elongated members, sacks or such small items as cinder blocks and bricks. It will be obvious that vehicles carrying such items must provide means for tying the items down so that they do not shift in transit or even fall off the flat-bed portion of the vehicle. A conventional and well known means in order to retain such items in a condition which prevents the item from falling or shifting is to employ either a chain, rope or cable which is tied around the carried items. In such an instance, in order to insure a tight binding characteristic the ends of the cable are drawn taut by some suitable means. When a chain is employed a lever mechanism is used to bring the end links of the chain in juxtaposition through which a retaining bolt may be placed. Unfortunately as the vehicle moves in transit from one point to another the load thereon has a tendency to shift and to shake down thereby loosening the cable or chain utilized. It is then often necessary for the driver or his assistant to reapply the tightening mechanism in order to retighten the cable or chain. It will be appreciated that such an operation is a time consuming job since the vehicle must be halted and the driver or his helper must disembark therefrom and unleash each of the cables or chains employed and apply the tightening mechanism to each chain or cable in sequence in order to retighten the entire load. A time consuming operation of this nature is a costly factor in transportation costs.

It is, therefore, a primary object of the present invention to disclose an ingenious device for tightening a cable about a load on a flat-bed vehicle.

It is another object of the present invention to provide a mechanism for not only tightening a cable about a load on the flat-bed of a vehicle but to retain a strong tension on the cable even though the load on the flat-bed vehicle may shift during transit.

It is yet another object of the present invention to provide an ingenious mechanism for tightening a load on the flat-bed of a vehicle which mechanism is situated in an unobtrusive position, that is, below the flat-bed portion of the vehicle.

It is still another object of the present invention to disclose a mechanism which is employed to tighten the binding cable about a load on a flat-bed vehicle through an ingenious leverage system.

It is yet still another object of the present invention to disclose a mechanism which contains its own supply of cable for binding a load on a flat-bed vehicle.

It is an additional object of the present invention to disclose a mechanism which more quickly binds a load on a flat-bed vehicle by simple up and down movement of a hand operated lever system.

It is an additional object of the present invention to disclose a mechanism providing means for easily retightening the cable about a load by simple up and down movements of a hand operated lever system without untying the cable.

Additional objects of the present invention will become apparent from the following detailed description taken in conjunction with drawings wherein like reference numerals refer to like parts throughout the drawings and the specification.

Figure 1:
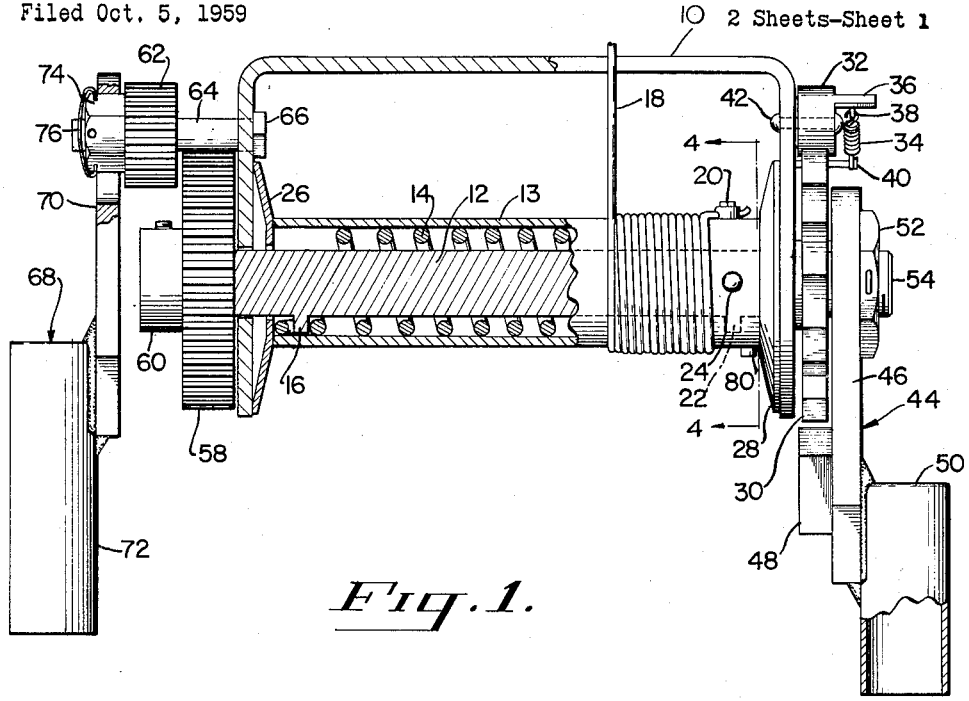
FIGURE 1 is a front elevation of the ingenious device of the present invention with a portion thereof in cross-section.
Figure 2:
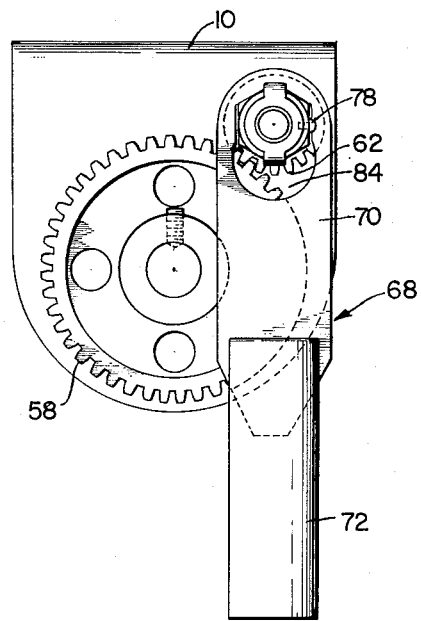
FIGURE 2 is a side elevation showing the left side of the device of the present invention.
Figure 3:
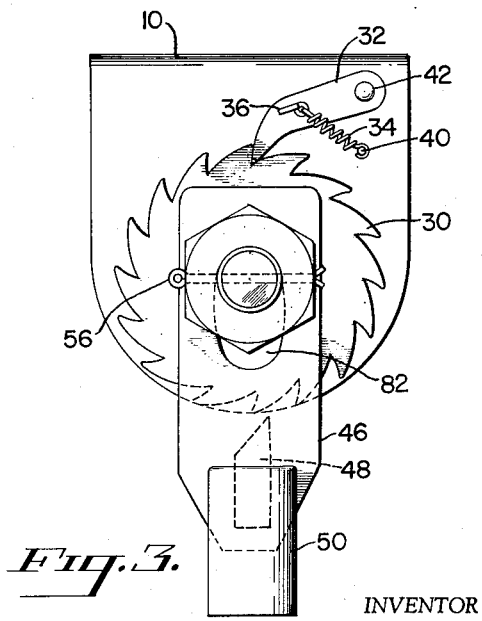
FIGURE 3 is a side elevation of the device of the present invention showing the right side thereof.
Figure 6:
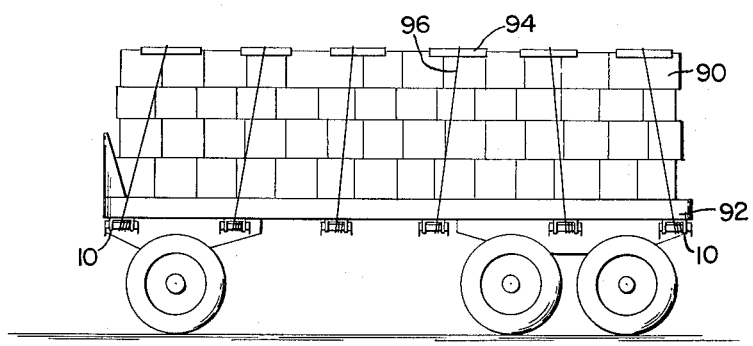
FIGURE 6 is a side elevation showing a flat-bed vehicle employing the mechanism of the present invention.

Now turning to the drawings for a detailed consideration of the device of the present invention, reference numeral 10 shows a U-shaped metal bracket between which a shaft 12 is mounted. A drum 13 is concentrically positioned about shaft 12 and is in spaced relationship therewith. A spring 14 is positioned within the space between shaft 12 and drum 13. Shaft 12 has a securing member 16 at one end about which the end portion of spring 14 is positioned. The cable 18 which is employed in tying down the load is seen to be wound about drum 13. The end portion of cable 18 is retained by a suitable nut and bolt 20. Shaft 12 has a lug thereon shown by reference numeral 22 and extends perpendicularly to the shaft. Drum 13 is seen to have a bolt 24 extending into the interior thereof and in the same plane as lug 22. The drum 13 has a left flange 26 and a right flange 28. Shaft 12 passes through the leg portions of bracket 10 and extends beyond at both ends thereof. At the right side as shown in the drawing the ratchet wheel 30 is secured in a conventional manner to the right extending portion of the shaft 12. A pawl 32 is in engagement with ratchet 30. Pawl 32 is biased to be in engaging relationship by spring 34. Pawl 32 has a hand lever 36 for lifting it from engagement with ratchet 30. An eyelet-like member 38 on the pawl and shaft 40 cooperate to secure the portions of spring 34. The pawl is pivoted by means of shaft 42 which is suitably secured at one end to bracket 10. Slightly to the right of the ratchet 30 a lever 44 is positioned. Lever 44 comprises an upper portion 46 having an upwardly facing tooth portion 48 suitably secured thereon in the same plane as ratchet 30. Lever 44 also has an extension portion 50 which is a short hollow cylindrical tube for receiving a torque increasing handle. Lever 44 is retained on shaft 12 by large nut-like member 52 which is threaded on thread portion 54 of the shaft 12. A suitable cotter pin 56 passes through the nut and the threaded portion 54 of the shaft so that it is prevented from disengagement from the shaft. At the left side of the shaft 12 a gear 58 is mounted on the extending portion of shaft 12. Gear 58 has a conventional portion 60 through which a set screw is positioned in a depression in shaft 12. A smaller gear 62 is mounted above gear 58 on shaft 64 which may be a bolt. Gear 62 is slidable on shaft 64 towards the bracket 10. It will be seen that gear 62 is a smaller gear than 58 so that torque multiplication may be effected when gear 62 is given rotation. Shaft 64 has head portion 66 which is secured to the bracket. At the other end, lever 68 is positioned. This lever comprises an upper flat portion 70 and a tubular portion 72 for receiving a rod member in order to increase torque. Lever 68 rests on the hexagonal portion 74 which is a part of gear 62. A resilient member 76 is secured to the shaft 64 and holds gear assembly 62 in place. A small pin 78 prevents lever 68 from becoming disengaged. Turning to FIGURES 2 and 3 for further consideration and a better view of the side portions of the device, attention is called to elliptical opening 82 on lever portion 46 of lever 44 and opening 84 on lever portion 70 of lever 68. More will be said about the function of these openings in the following description pertaining to the operation of the device. Attention is also directed to FIGURE 6 where it will be seen that the device of the present invention is positioned beneath the flat-bed portion of a truck. The flat-bed portion is shown by reference numeral 92. Boxes loaded with merchandise or the like are seen to be positioned on the truck; along the upper edge portion of the boxes elongated members 94 are positioned. From each device below the flat-bed portion of the truck a cable 96 is passed up and over the load and is secured to the other side. This drawing is merely illustrative of the use to which the present invention may be employed. For instance the flat-bed vehicle may carry sacks, pipes, wooden boards, cinder blocks, or bricks and may be held in position by virtue of the present device.

Figure 4:
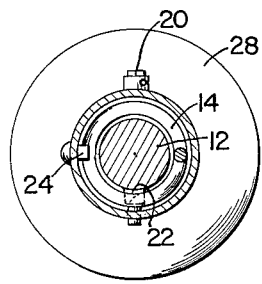
FIGURE 4 is a cross-sectional view taken along lines 4—4 of FIGURE 1.
Figure 5:
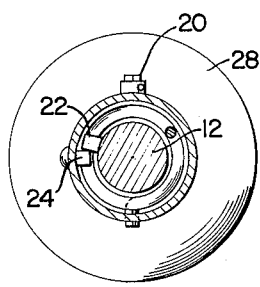
FIGURE 5 is a cross-sectional view taken along the same lines showing the device in another position.

In operation, the pawl is lifted out of engagement with the ratchet and the cable which is wound on the drum 13 is pulled out of the drum portion. This is easily accomplished because the ratchet turns freely in a direction permitting the drum to rotate once the pawl is disengaged and lever 44 is in a downward position. Additionally, by insuring that gear 62 is not meshed with gear 58 the drum is free to rotate. When enough cable has been unrolled from the drum the pawl is released and the cable is thrown over the loaded vehicle to the other side. The end of the cable has a suitable hook or link so that it may be fastened to a hook positioned at the other side of the truck. When this has been accomplished a lever or handle is inserted into lever end portion 50 and the lever mechanism is then raised so that it rotates in a clockwise direction. The lever 44 is raised to a position substantially as far as it will go which is generally to the edge of the truck or to the edge of the load. The lever mechanism 44 having considerable weight, being constructed of steel or other suitable material, is permitted to fall downwardly and away from the operator due to the elliptical opening 82. When it does so, tooth 48 which is in the same plane as ratchet 30 falls between two of the teeth of ratchet 30. When it is in this position lever 44 is pulled downwardly in a counter-clockwise direction. As this is accomplished the ratchet is turned thereby turning shaft 12. Since shaft 12 is not directly coupled to drum 13 shaft 12 rotates while drum 13 does not immediately revolve. As shaft 12 turns the spring 14 tightens since it is hooked at one end to shaft 12 by retaining member 16 and positioned at the other end on drum 13 by means of hole 80. In this manner it will be appreciated that the shaft will attempt to drag the drum as the spring is tightened. However, before considerable dragging ensues shaft 12 rotates for approximately 270 degrees so that now lug 22 is impinging or in abutment with bolt 24 on the interior portion of the drum. By continuing the rotation of the shaft it will be seen that lug 22 will continue to abut on bolt 24 thereby coupling the rotation so that both the shaft and the drum now turn together. In order to illustrate this, FIGURE 4 shows lug 22 and bolt 24 being separated by 270 degrees in one direction and 90 degrees in the other. FIGURE 5 shows a condition where shaft 12 has been rotated to substantially 270 degrees so that now it is in abutment with bolt 24 by means of lug 22. When lever 44 has been brought to its lowermost position it will disengage from the ratchet 30 due to the fact that it has weight and will move downwardly because of the elliptical opening 82. In order to effect another turn of the drum to tighten the cable further, lever 44 is then once again brought upwardly so that tooth 48 falls once more into engagement with ratchet 30. This operation may be repeated for as many times as necessary to tighten the cable sufficiently.

In the event that further tightening is required even though the cable has been tightened by means of lever 44, the gear system on the left side of the bracket may be brought into play. Gear 62 assembly is pushed to the right, away from retaining spring 76, so that it meshes with gear 58. Lever 68 is not free swinging as is lever 44 due to the fact that the hexagonal portion of opening 84 is in contact with the hexagon portion 74 of gear 62. Lever 68 is only operated to turn the shaft sufficiently so that pawl 32 moves from one tooth to the next on ratchet 30 thereby preventing the drum from rotating. The multiple torque effect produced by the gear system permits an increased tightening not possible with the ratchet system alone. This increased torque is accomplished by raising lever 68 thereby giving counter-clockwise rotation to drum 13 through gear 58. When lever 68 is brought to its uppermost position it is pushed away from the operator so that the rounded portion of opening 84 is now in position with hexagonal portion 74. This makes lever 68 free swinging so that it may be turned downwardly. In its downward position its weight will once again bring the hexagonal portion of opening 84 into contact with the hexagonal portion 74 of gear 62.

In the practice of the present invention it has been discovered that the spring 14 must be positioned about shaft 12 in such a manner that it is spaced away therefrom and in relative abutment with the interior portion of drum 13. As the spring is tightened it will have the tendency to become more closely associated about shaft 12.

If, during the transit of the loaded vehicle the load shakes down and thereby becomes loosened, it will usually not be necessary for the driver to stop the vehicle in order to re-tighten the cable. In the instant device the cable will be held under tension by virtue of the spring 14. It will be appreciated that a relatively slight slack in the cable will be absorbed by the spring which has been tightened during the tensioning step described in the above. However, should the cable become too loosened, it is an easy matter to re-tighten the cable by simple up and down lever movements without untying the cable.

It will be apparent that many changes and modifications of the several features of the device described herein may be made without departing from the spirit and scope of the invention. It is, therefore, to be understood that the foregoing description is by way of illustration of the invention rather than limitation upon the invention.

What is claimed is:

1. A load binding cable tightening device comprising a bracket, a shaft mounted on said bracket, a cable drum mounted concentrically and in spaced relationship with said shaft, a helical spring concentrically positioned between the shaft and drum, said spring having one end secured to the shaft and the other end secured to the drum, a first lug extending outwardly from the shaft, a second lug extending inwardly from the interior surface of the drum and in the same plane as the first lug, the end portions of the shaft extending beyond the drum, a ratchet mounted on said end portion, a pawl pivotally mounted on said bracket and in operative relationship with said ratchet, a lever eccentrically pivoted on the said end portion of the shaft, said shaft passing through a substantially elliptical opening in said lever, the lever having a tooth portion adapted to cooperate with the ratchet, a first gear mounted on the other end of the shaft, a smaller second gear mounted on a gear shaft one end in slidable relationship with said bracket and adapted to be moved into cooperative relationship with said first gear, a lever pivotally mounted on the other end of said gear shaft.

2. A cable tightening device comprising a U-shaped bracket, a shaft mounted between the legs of said bracket, a cable drum mounted concentrically and in spaced relationship with said shaft said drum having flanges, a helical spring concentrically positioned between the shaft and drum, said spring being furthermore spaced from said shaft when said device is in an inoperative condition, said spring having one end secured to the shaft and the other end secured to the drum, a first lug extending outwardly from the shaft, a second lug extending inwardly from the interior surface of the drum and in the same plane as the first lug, the end portions of the shaft extending beyond the drum, a ratchet mounted on said end portion, a pawl pivotally mounted on said bracket and in operative relationship with said ratchet, a lever eccentrically pivoted on the said end portion of the shaft, said shaft passing through a substantially elliptical opening in said lever, the lever having a tooth portion adapted to cooperate with the ratchet, a first gear mounted on the other end of the shaft, a smaller second gear mounted on a gear shaft one end in slidable relationship with said bracket and adapted to be moved into cooperative relationship with said first gear, a lever pivotally mounted on the other end of said gear shaft.

References Cited in the file of this patent

UNITED STATES PATENTS

| | | |
|---|---|---|
| 2,582,987 | Hagenbook | Jan. 22, 1952 |
| 2,776,815 | Sheard | Jan. 8, 1957 |
| 2,838,190 | Stevens | June 10, 1958 |
| 2,889,136 | Prete | June 2, 1959 |
| 2,946,563 | Eaton | July 26, 1960 |